US012531636B2

(12) United States Patent
Gette et al.

(10) Patent No.: US 12,531,636 B2
(45) Date of Patent: *Jan. 20, 2026

(54) SYSTEM AND METHOD FOR CONFIGURABLE INVISIBLE LIGHT COMMUNICATIONS

(71) Applicant: eSTS, Inc., Landover, MD (US)

(72) Inventors: Dennis L. Gette, Charleston, SC (US); Thomas J. McAvoy, Cantonsville, MD (US)

(73) Assignee: eSTS, Inc., Landover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/602,857

(22) Filed: Mar. 12, 2024

(65) Prior Publication Data
US 2024/0223279 A1 Jul. 4, 2024

Related U.S. Application Data

(63) Continuation of application No. 17/752,833, filed on May 24, 2022, now Pat. No. 11,967,987.
(Continued)

(51) Int. Cl.
H04B 10/112 (2013.01)
H04B 10/114 (2013.01)
(Continued)

(52) U.S. Cl.
CPC ..... *H04B 10/1129* (2013.01); *H04B 10/1125* (2013.01); *H04B 10/1143* (2013.01); *H04B 10/502* (2013.01); *H04B 10/5161* (2013.01)

(58) Field of Classification Search
None
See application file for complete search history.

(56) References Cited

U.S. PATENT DOCUMENTS 4,560,270 A * 12/1985 Wiklund ................. G01S 17/36
356/5.1
4,995,101 A * 2/1991 Titterton ................. H04B 10/11
398/119
(Continued)

OTHER PUBLICATIONS

European Patent Office Search Report, EPO App. No. 22838203.2, dated Mar. 17, 2025.
(Continued)

*Primary Examiner* — Jai M Lee
(74) *Attorney, Agent, or Firm* — King & Spalding LLP

(57) ABSTRACT

An invisible light communication system can communicate using infrared or ultraviolet light signals to provide more secure communications. The system includes a software definable and hardware configurable transmitter that uses an input, an encoder, an invisible light source, and an optic to transmit an invisible light signal. The system also includes a software definable and hardware configurable receiver that receives the invisible light signal using an optic, a detector, a detector, and an output. Applications for the invisible light communication system include fixed, deployable, vehicle, and wearable configurations for voice, video and data transmission and receipt in support of a variety of use cases: remote sensing; data exfiltration; remote control, ordnance detonation; tactical chat/messaging; point-to-point and point-to-multipoint audio communications; and full motion video.

20 Claims, 14 Drawing Sheets

Related U.S. Application Data

(60) Provisional application No. 63/192,919, filed on May 25, 2021.

(51) Int. Cl.
*H04B 10/50* (2013.01)
*H04B 10/516* (2013.01)

(56) References Cited

U.S. PATENT DOCUMENTS

| | | | | |
|---|---|---|---|---|
| 4,996,719 | A * | 2/1991 | Okazaki | H04B 10/1143 398/187 |
| 5,305,132 | A * | 4/1994 | Fasen | H04B 10/1149 398/41 |
| 5,506,716 | A | 4/1996 | Mihara | |
| 5,648,862 | A * | 7/1997 | Owen | H04B 10/11 398/128 |
| 5,844,824 | A * | 12/1998 | Newman | G06F 1/163 345/156 |
| 5,966,226 | A * | 10/1999 | Gerber | F41A 33/02 398/190 |
| 6,239,888 | B1 | 5/2001 | Willebrand | |
| 6,950,635 | B1 * | 9/2005 | Miyamaru | B62J 50/22 455/100 |
| 7,095,981 | B1 * | 8/2006 | Voroba | H04M 1/737 375/295 |
| 7,338,375 | B1 * | 3/2008 | Small | F41A 33/02 463/39 |
| 7,477,922 | B2 * | 1/2009 | Lewis | H04M 1/05 455/90.3 |
| 8,184,983 | B1 * | 5/2012 | Ho | H04B 10/1143 345/8 |
| 8,195,253 | B2 * | 6/2012 | Roberts | H04B 5/24 340/928 |
| 9,602,203 | B2 * | 3/2017 | Mateti | H04B 10/1149 |
| 9,826,089 | B2 * | 11/2017 | Rauenbuehler | H04W 4/80 |
| 9,917,646 | B2 | 3/2018 | Turgeon | |
| 9,929,806 | B2 | 3/2018 | Wabnig | |
| 9,998,217 | B2 * | 6/2018 | Li | H04B 10/1125 |
| 10,019,881 | B2 * | 7/2018 | Chung | G08B 25/016 |
| 11,080,983 | B2 * | 8/2021 | Martini | G01S 1/7032 |
| 11,087,572 | B2 * | 8/2021 | Einberg | G07C 9/00309 |
| 11,546,056 | B2 * | 1/2023 | Ooi | H04B 10/11 |
| 11,575,433 | B1 | 2/2023 | Chaffee | |
| 11,616,087 | B2 | 3/2023 | Nydell | |
| 11,616,571 | B2 * | 3/2023 | Khatibzadeh | H04B 10/67 398/182 |
| 11,871,323 | B2 * | 1/2024 | Chen | H04W 4/80 |
| 2003/0054784 | A1 * | 3/2003 | Conklin | H04M 1/05 455/151.2 |
| 2006/0293092 | A1 * | 12/2006 | Yard | A42B 3/30 455/575.2 |
| 2009/0193993 | A1 | 8/2009 | Hummel | |
| 2010/0304674 | A1 * | 12/2010 | Kim | H04W 76/10 455/41.2 |
| 2012/0002970 | A1 * | 1/2012 | Gerber | H04B 10/25 398/108 |
| 2015/0168725 | A1 | 6/2015 | Kimura | |
| 2016/0087722 | A1 * | 3/2016 | Wabnig | H04B 10/1143 398/131 |
| 2016/0127040 | A1 | 5/2016 | Vaananen | |
| 2018/0062766 | A1 | 3/2018 | Ooi et al. | |
| 2020/0265726 | A1 | 8/2020 | LeBlanc | |
| 2022/0021440 | A1 * | 1/2022 | Perruchot | H04L 67/12 |
| 2022/0239373 | A1 * | 7/2022 | Nykolak | H04B 10/1127 |
| 2022/0345221 | A1 * | 10/2022 | Mitchell | H04B 10/1121 |

OTHER PUBLICATIONS

Fahs Bassem et al., "a 12-m 2.5 Gb/s Lighting Compatible Integrated Receiver for OOK Visible Light Communication Links", Journal of Lightwave Technology, IEEE, USA, vol. 34, No. 16, Aug. 15, 2016, pp. 3768-3775.

International Search Report dated Mar. 27, 2023 for PCT/US2022/030792.

Sackinger, Eduard, Lecture Notes on: Broadband Circuits for Optical Fiber Communication, 2002 (Year: 2002).

* cited by examiner

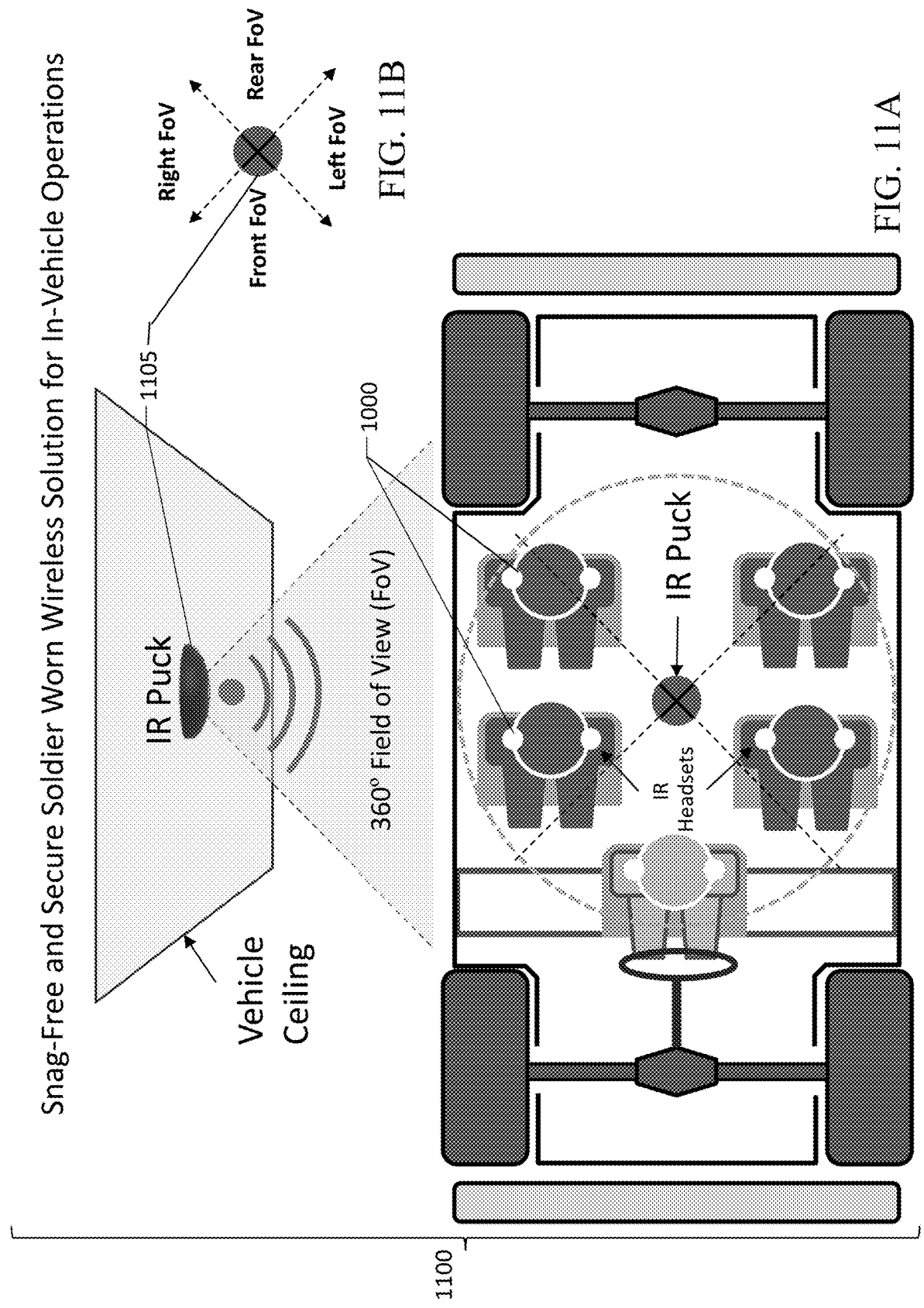

SYSTEM AND METHOD FOR CONFIGURABLE INVISIBLE LIGHT COMMUNICATIONS

RELATED APPLICATIONS

The present application is a continuation application of and claims priority to U.S. Non-provisional patent application Ser. No. 17/752,833 filed May 24, 2022, which application claims priority to U.S. Provisional Patent Application No. 63/192,919 filed on May 25, 2021. The entire contents of the foregoing applications are incorporated herein by reference.

TECHNICAL FIELD

Embodiments of the present disclosure are directed to systems and methods that use invisible light communication.

BACKGROUND

Conventional approaches to wireless communication typically rely on radio frequency communication. However, radio frequency communication has a variety of shortcomings, particularly in the context of military, law enforcement, or special use applications. For instance, radio communications can be degraded due to electromagnetic interference in the environment as well as deliberate communication jamming. Radio communications are subject to being intercepted and the interception may not be detectable by the parties relying upon the radio communications. Furthermore, underwater radio communication suffers from considerable attenuation, resulting in extremely low transmission distances and data rates. Accordingly, there is a need for improved systems and methods for wireless communication that provide greater dependability, security, and performance over the air and underwater.

SUMMARY

The present disclosure is generally directed to systems and methods for configurable invisible light communications. In particular, the example embodiments described herein implement invisible light communication transmitters and receivers that include software and hardware facilitating configuration of the devices for a variety of applications.

In one example embodiment, the present disclosure is directed to a system that includes a transmitter, wherein the transmitter includes a transmitting signal processor and a modulator, an emitter, and an emitter optic. The transmitting signal processor processes an electrical signal from an input device and the modulator modulates the signal to produce a modulated electrical signal. The emitter receives the modulated electrical signal and, in response, emits a beam of light in one of the infrared spectrum or the ultraviolet spectrum. The emitter optic is diverging and produces a broadened beam of light from the beam of light received from the emitter. The system further includes a receiver, wherein the receiver includes a receiver optic, a photosensor, a demodulator and a receiving signal processor. The receiver optic receives the broadened beam of light from the transmitter and produces a converging beam of light. The photosensor detects the converging beam of light and, in response, produces a received electrical signal. The demodulator demodulates the received electrical signal and the receiving signal processor processes the signal for use by an output device.

In another example embodiment, the present disclosure is directed to a method that includes: (i) emitting by an emitter of a transmitter, an encoded invisible light signal, the encoded invisible light signal encoded by an encoder of the transmitter; (ii) detecting, by a photosensor of a receiver, the encoded invisible light signal; (iii) producing, by the photosensor of the receiver, an encoded electrical signal from the encoded invisible light signal; (iv) decoding, by a decoder of the receiver, the encoded electrical signal to produce a decoded electrical signal; and (v) outputting the decoded electrical signal at the output interface of the receiver.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments of methods and systems using invisible light communication and therefore are not to be considered limiting of the scope of this disclosure. The principles illustrated in the example embodiments of the drawings can be applied to alternate methods and apparatus. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

FIGS. 11A and 11B illustrate an application of an invisible light communication system as a wearable wireless intercom communication system in accordance with example embodiments of the disclosure.

DETAILED DESCRIPTION OF EXAMPLE EMBODIMENTS

Figure 1:
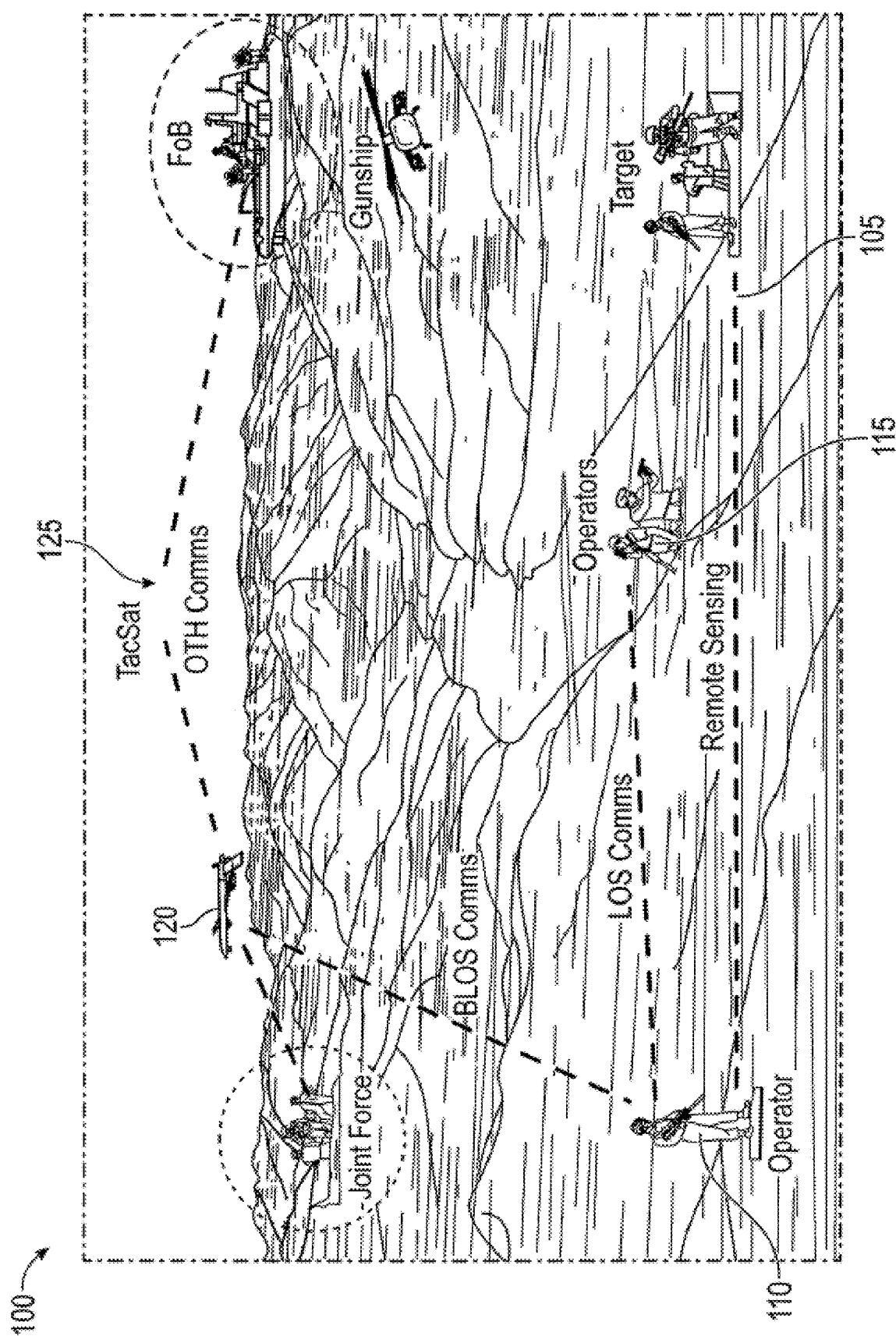
FIG. 1 is a perspective view of a military, law enforcement, and special use environments in which invisible light communications are implemented in accordance with example embodiments of the disclosure.

To overcome the previously described challenges, the present disclosure provides apparatus and methods for communications using invisible light transmissions, including infrared light and ultraviolet light. The invisible light communication ("ILC") systems described herein permit persistent and reliable data, voice, and video communications, both in the air and underwater, in environments where radio frequency communications may be subject to interference, jamming, detection, or interception. The ILC systems described herein have relatively low size, weight, and power requirements making them suitable for a variety of applications, including fixed-site, vehicular, portable, aerial, and underwater operations.

The ILC systems described herein can operate in the infrared portion of the electromagnetic spectrum that is not only invisible to the human eye and ordinary infrared cameras, but also to generation 3 and 4 night vision equipment. In certain examples, the ILC systems described herein operate in the infrared range of 900 nm to 1700 nm. More preferably, the ILC systems described herein operate in the range of 1540 nm to 1560 nm in order to avoid detection while minimizing signal loss.

In other examples, the ILC systems described herein can operate in the ultraviolet range of 10 nm to 400 nm of the electromagnetic spectrum. In examples suited for underwater applications as described further in connection with FIG. 8, the ILC systems described herein can operate in the UV-A range (315 nm-400 nm), the UV-B range (280 nm-315 nm), and the UV-C range (100 nm-280 nm). Additionally, the UV-C range is of particular interest for the applications described herein because solar radiation in the UV-C range does not reach the Earth's surface due to ozone absorption in the upper atmosphere. Due to this characteristic, the UV-C range is also referred to as the "solar blind" range. The absence of solar radiation in the UV-C range in the lower atmosphere means there is no background UV-C light in the lower atmosphere to drown out or interfere with invisible light communications using the UV-C range. This solar blind characteristic allows invisible light communications using the UV-C range to be more easily detected and processed by the receivers used in connection with the ILC systems described herein.

Furthermore, the disclosed ILC systems require maintaining line of sight between the transmitter and the receiver of the systems. In order to disrupt or intercept an invisible light beam, a perpetrator or adversary would have to first detect the beam using a highly expensive, ITAR-controlled area-scan InGaAs sensor (imager), and then place themselves or a solid barrier in the beam's path. Attempting to disrupt or intercept the invisible light beam would expose the perpetrator or adversary and make the attempted interception known to the operators of the invisible light communication system. In addition, interception of the beam is virtually impossible without knowledge of how the communications are encoded in the ILC system's specific transmitter and receiver design and implementation. Accordingly, the invisible light communications of the systems disclosed herein have a very low likelihood of detection and interception.

As background, the following is a brief description of existing light communication technologies and their limitations. Optical wireless communications ("OWC") and free-space optical ("FSO") systems are an optical communication technology that uses light propagating in free space to wirelessly transmit data for telecommunications or computer networking. Data are transmitted by modulating a light emitting diode or laser diode at a high rate of speed. OWC or FSO systems operating in the visible band (390-750 nm) are commonly referred to as "visible light communication," while FSO systems operating at the near-infrared frequencies (750-1600 nm) are invisible to the human eye. OWC and FSO systems rated as Class 1 or 1M are safe to use in public places while those marked 'Class 3B' or higher are not eye safe. Light beams in Class 1 or 1M have a width greater than 7 mm, which is the maximum aperture (fully dilated pupil size) of the human eye. When the width of the beam is greater than 7 mm, the human eye can only absorb a portion of the light beam and thus avoid damage to the eye. The ILC system embodiments disclosed herein use light emitting diodes and optical systems that fall into the Class 1 or Class 1M designations.

FSO systems rely on state-of-the-art Pointing, Acquisition, and Tracking (PAT) because of the need to precisely couple the optical beam entering the optical front end of the receiver into an 8-10 μm diameter core of a single mode fiber. The PAT is needed to track the beam's angle-of-arrival (AOA) fluctuations and steering it into the fiber core to maintain a link between their transceivers, such that their implementation is highly complex and costly. OWC encompasses any optical communication technology, including FSO, that uses freely propagating light to send a signal from one point to another. OWC applications are generally restricted for use in short and medium range applications, such as indoor IR and VLC-based local area networks (WLANs), inter-vehicular, and vehicle-to-infrastructure communications. The complexity of OWC and FSO systems restricts the ability to use them in many applications. As another example of their limitations, OWC and FSO systems rely on fixed frequency operations and, as a result, lack the frequency agility to switch between over the air to underwater modes of operation. In contrast, as described further below, the ILC systems disclosed herein provide the versatility to rapidly change the emitter and receiver for different frequencies which facilitates adapting between over the air and underwater modes of operation.

Furthermore, the lack of portability of OWC and FSO systems makes them unsuitable for quick reaction, rapid deployment, vehicular, personnel carry, aerial, and underwater operations. In contrast, the physical specifications and requirements of the disclosed ILC systems, in which the functionality of the ILC systems are software definable and hardware configurable for a specific use case, provide versatility to support using the systems in a variety of applications.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Referring to FIG. 1, example uses of ILC systems are illustrated in a operational environment 100. Examples of such an environment can include but are not limited to a law enforcement environment, a military environment, and a special forces environment. One example is an ILC system 105 used for remote sensing of a target. In the example of ILC system 105, one or more sensors, such as a motion or acoustic sensor, can detect the presence of a target and the ILC system 105 can transmit an indication of the detected target to a receiver operated by remote operations personnel 110. In one example, the ILC system 105 comprises a transmitter at the location of the one or more sensors and a receiver operated by the operations personnel 110. Details concerning the components and operation of example transmitters and receivers of ILC systems will be described further below.

In another example, the receiver operated by remote personnel 110 can be a transceiver and the ILC system 105 can comprise one or more additional receivers and/or transceivers. For example, remote personnel 110 can use a transceiver to communicate via invisible light with another ILC transceiver operated by remote personnel 115 at another location. Transceivers that include both a transmitter and receiver facilitate communications via the ILC system that are bidirectional and that can include one or more of data, voice, and video communications.

For the ILC voice link use case, the receiver incorporates a photodetector with a sufficiently large active area that yields a field of view of nearly 180 degrees at a distance of over 500 meters using low medium powered (1120 mW/sr) LEDs. Distances of over 1 km will be possible using high powered (2200 mW/sr) LED as evidenced using a dual (1120 mW/sr) beam configuration at a link distance of approximately 1697 m. The resulting wide field of view permits multiple transmitters to establish a link with a single receiver, making it possible to conduct point-to-multipoint communications among three or more communications nodes for not only for the voice link application, but also the remote sensing and tactical chat use cases.

Remote personnel, both 110 and 115, also can use the ILC system for long-range communications. One example of such long-range communications involves using an aircraft 120 to relay invisible light communications. The aircraft 120 can receive invisible light communications from remote personnel 110 and/or 115 and can transmit those communications to other receivers of the ILC system or to other communications equipment such as a satellite 125. The foregoing examples are merely illustrative of the variety of applications for the ILC system. The ILC system components and their application will be described further in the examples that follow.

Figure 2A:
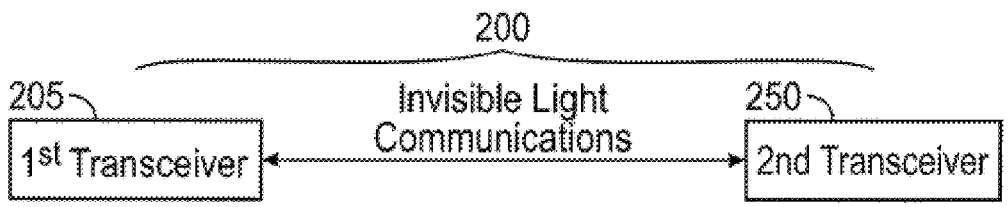
FIGS. 2A, 2B, and 2C illustrate components of an invisible light communication system in accordance with example embodiments of the disclosure.
Figure 2B:
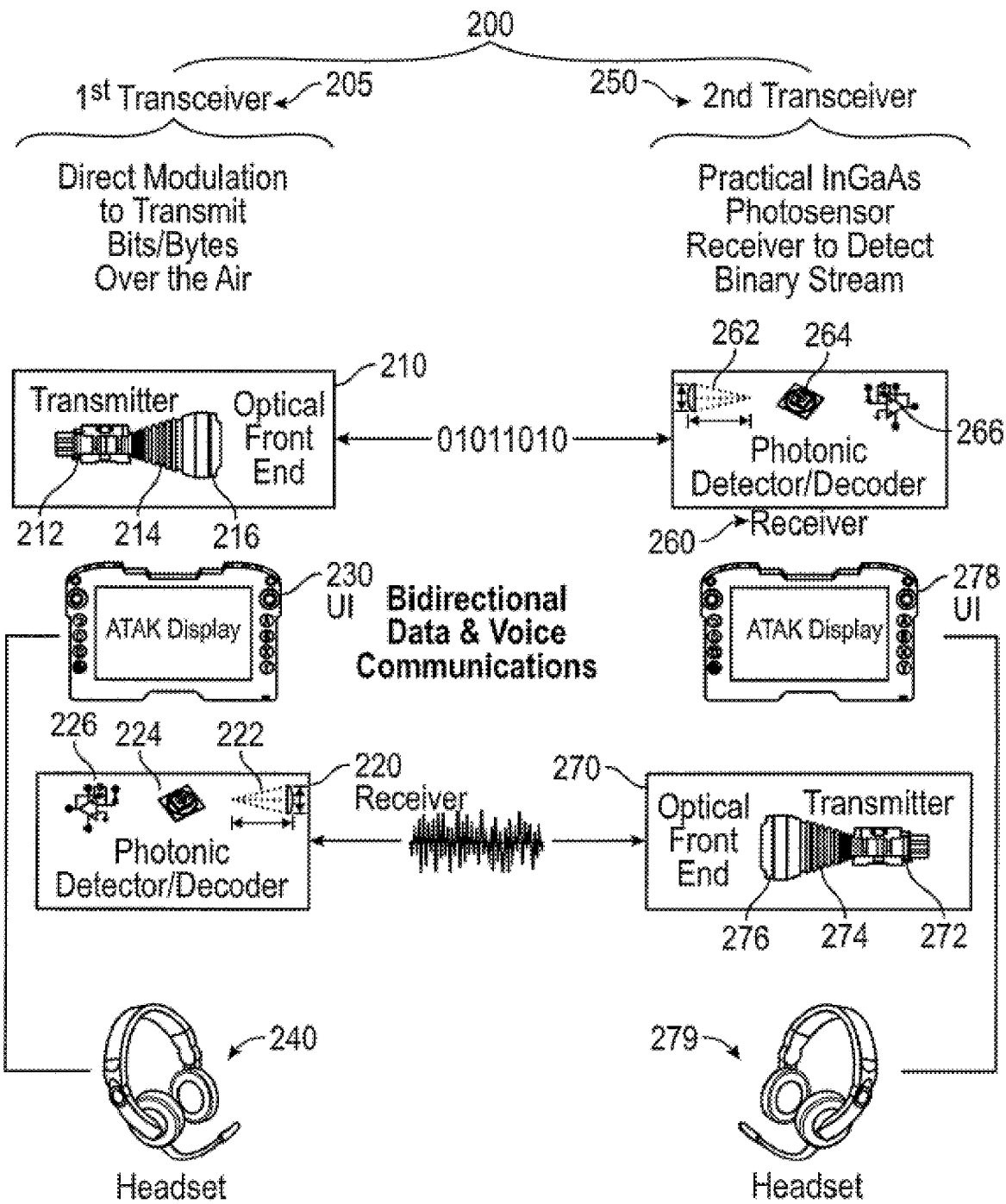
Figure 2C:
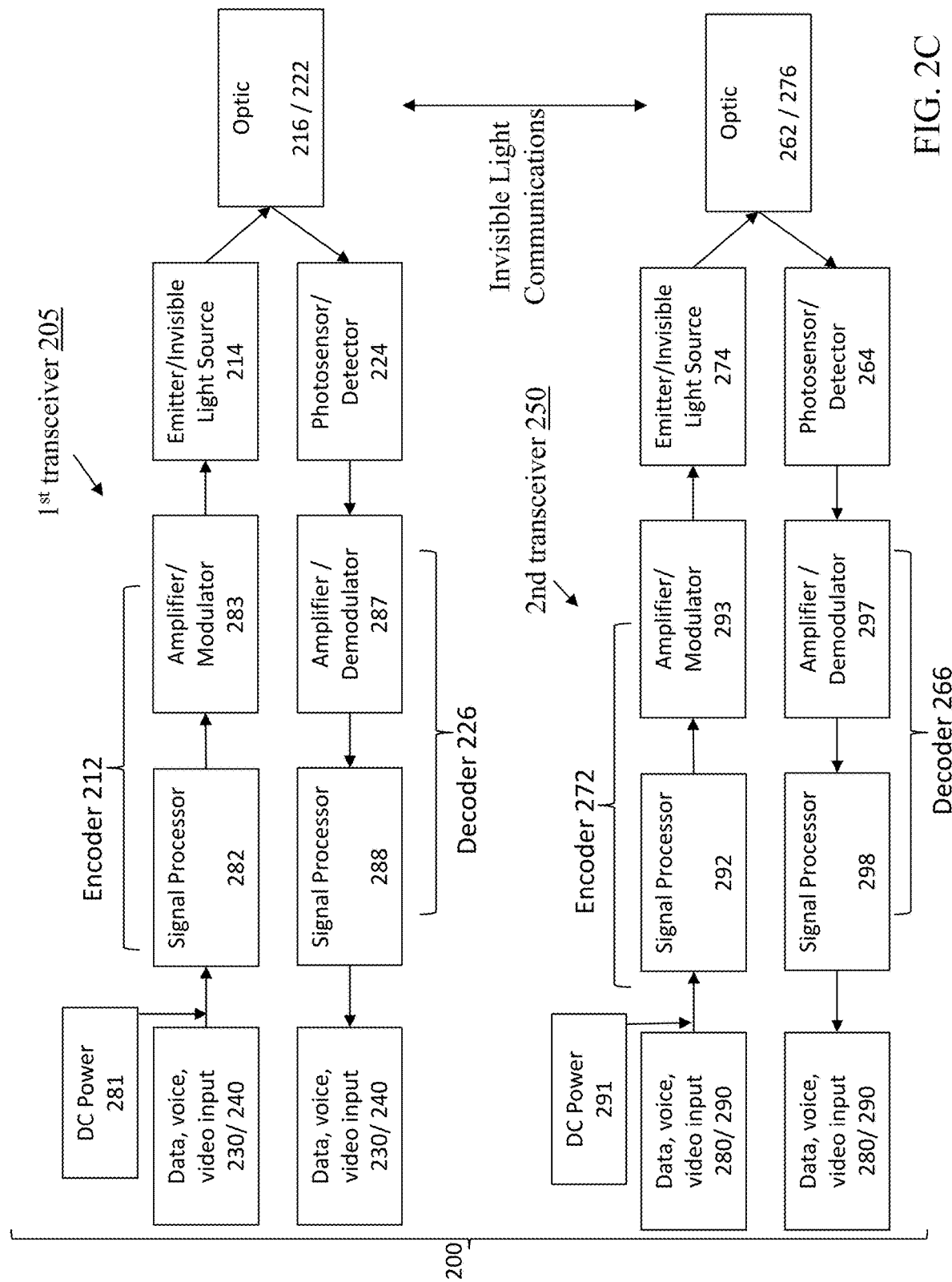
Figure 3:
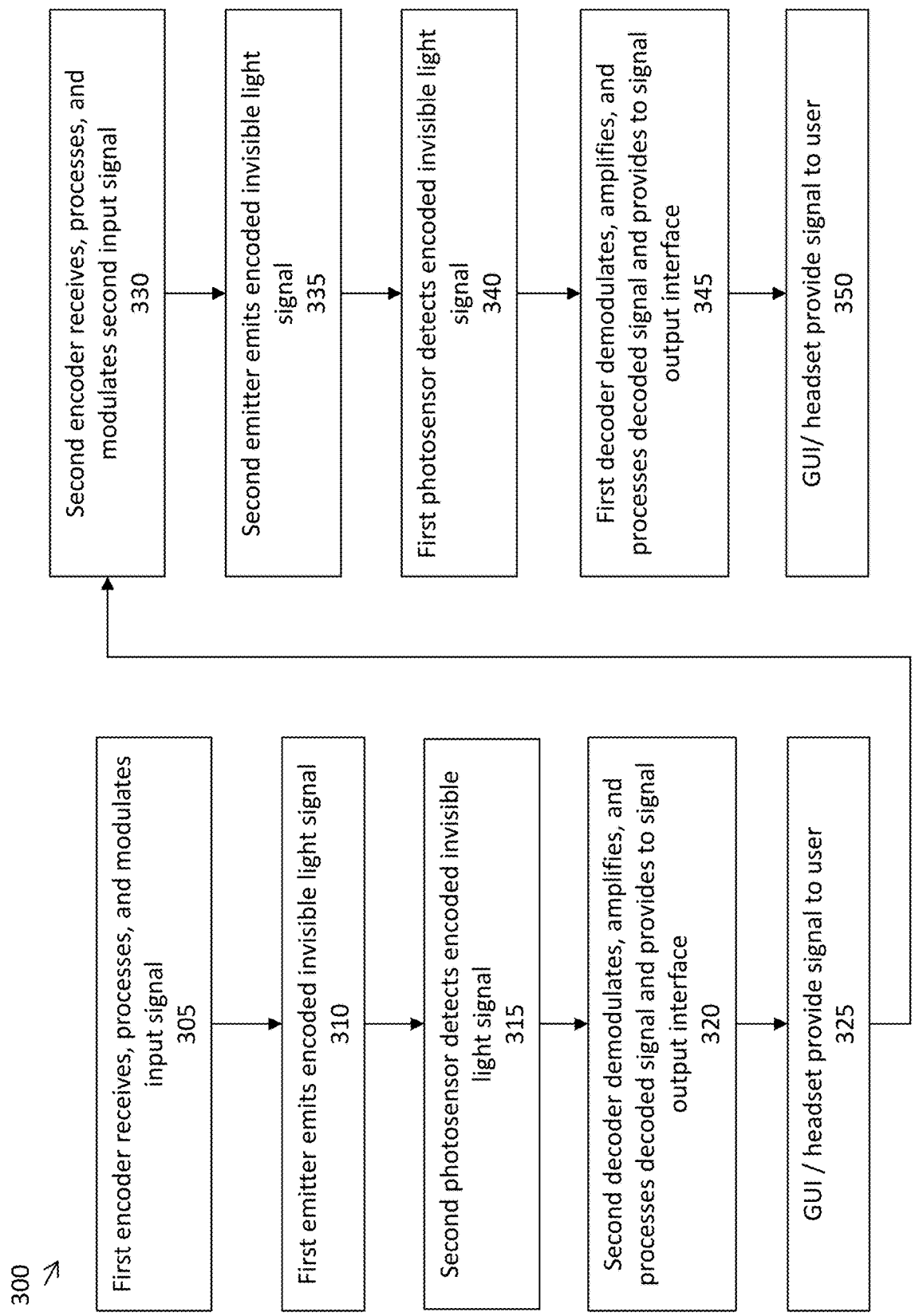
FIG. 3 is a flow chart illustrating a method of operating an invisible light communication system in accordance with example embodiments of the disclosure.

Referring now to FIGS. 2A, 2B, 2C, and 3, the ILC system and its operation will be described in greater detail. FIGS. 2A, 2B, and 2C illustrate an example ILC system 200 and FIG. 3 illustrates an example method of operating the ILC system 200. While the example ILC system 200 illustrates only two transceivers 205 and 250 for simplicity, it should be understood that additional transmitters, receivers, or transceivers can be in communication with the first and second transceivers 205 and 250. Furthermore, in other example embodiments, the ILC system may include only a transmitter and a receiver.

FIG. 2A illustrates the first and second transceivers 205 and 250 of the ILC system 200 communicating bidirectionally. The first and second transceivers 205 and 250 can use light in the infrared or ultraviolet portions of the electromagnetic spectrum to communicate one or more of data, voice, and video bidirectionally. FIG. 2B illustrates the components of the first transceiver 205 and the second transceiver 250 in greater detail. FIG. 2C shows further details of the components of the first transceiver 205 and the second transceiver 250.

As illustrated in FIGS. 2B and 2C, the first transceiver 205 comprises a first transmitter 210 for sending communications and a first receiver 220 for receiving communications. Similarly, the second transceiver 250 comprises a second transmitter 270 for sending communications and a second receiver 260 for receiving communications. The first transceiver 205 can comprise a first DC power supply 281, such as a battery, and the second transceiver can comprise a second DC power supply 291, such as a battery. The first transmitter 210 comprises a first encoder 212 that can comprise a signal input interface, a signal processor 282, and a modulator and amplifier 283. The components of the encoder 212 can be interconnected, for example, by a system bus or by communication links. The signal processor 282 and the other processors referenced herein can be one or more hardware processors, such as a multi-core processing chip, a system on a chip, or a multichip module, that execute computer-readable instructions stored in memory as is known by those of skill in this field. The memory can be coupled to or integrated with the processors described herein and can store data along with the computer-readable instructions. The computer-readable instructions stored in memory and executed by the processor can include configuration settings and operation instructions for the transceiver. The computer-readable instructions will be referenced further below in connection with the example method 300 of FIG. 3.

The signal input interface of the first encoder 212 receives signals from one or more input devices. The input device of the first transceiver 205 can optionally comprise one or both of graphical user interface 230 and headset 240 to support data and voice communications. The signal input interface can receive an input signal in the form of voice or data from the graphical user interface 230, the headset 240, or another source of data and provide the input signal to the encoder 212.

As will be referenced further below and as illustrated in FIGS. 2B and 2C, the second transceiver 250 can comprise components analogous to the previously described components of the first transceiver 205. It should be understood that the components of the second transceiver 250 operate in a manner similar to the analogous components of the first transceiver 205. The operation of the components of FIGS. 2B and 2C will be described with reference to the example method 300 illustrated in FIG. 3. It should be understood that prior to or in conjunction with the steps illustrated in FIG. 3, various configuration settings can be stored in memory associated with the signal processor and particular configuration settings can be selected for the first transceiver 205 and the second transceiver 250. As one example, a particular encoding for the invisible light communication can be selected so that only receivers with a corresponding decoding ability will be able to decode the received communication. As another example, a particular wavelength can be selected for the invisible light communications. The emitter can be configurable so that it can emit light signals at different wavelengths. In some embodiments, the emitter can comprise multiple diodes wherein each diode emits light at a different wavelength and wherein a particular diode can be selected for communicating in a particular wavelength. Yet another example of a configuration setting can be a mode of operation that adjusts the position of the optic in the transceiver to control the emitted beam of light or the position of the optic in the receiver to control the received beam of light.

As illustrated in step 305 of example method 300 in FIG. 3, the first encoder 212 can receive an input signal at the signal input interface from an input device, can process the signal using signal processor 282, and can modulate a carrier signal using modulator/amplifier 283 in order to encode the input signal. The modulator/amplifier 283 can also amplify the encoded signal as needed. Instructions for processing and modifying the signal can be stored in memory associated with the processor. In step 310, the encoder 212 provides the encoded signal to an emitter 214, such as a light emitting diode or laser diode, that emits the encoded signal as light in the invisible portions of the electromagnetic spectrum.

The emitter 214 can be selected to emit invisible light in a particular desired range, such as the 1540 nm to 1560 nm portion of the infrared spectrum or the UV-A, UV-B, or UV-C portion of the UV spectrum. In certain embodiments, the emitter can comprise multiple emitter devices wherein each emitter device emits invisible light at a different wavelength. The advantage of multiple emitter devices within a transmitter is that it allows a user to make a selection in the field, such as via a graphical user interface input device, of one wavelength from multiple wavelength options. This ability to configure the wavelength of the emitted invisible light allows for adjustment of the transmitter based on field conditions or locations. For example, UV light can be a more effective communication medium than infrared for underwater environments. The modulated encoded signal causes the emitter 214 to turn on and off at a high rate of speed thereby providing the encoded light signal as optical pulses that can be transmitted through air or water. The encoded light signal also can be successfully transmitted in a variety of environmental conditions including rain, smog, smoke, fire, haze, and fog.

The first transmitter 210 also includes an optical front end, or simply an optic, 216. The optical front end 216 comprises an optic for shaping the light radiated by the emitter 214. The optic can modify the emitted light into a wider beam to facilitate reception of the light signal by the second receiver 260 of the second transceiver 250. In certain example embodiments, this is accomplished by positioning the emitter such that the light source is centered with respect to and incident to the planar surface of a positive focal length, plano-convex or Fresnel type lens. The distance between the emitter and the lens can be manually adjusted by the operator of the first transceiver 205 for shaping the beam. The lens diameter and focal length, in combination with the adjusted distance between the emitter and lens, is used to collimate the beam and produce a desired spot size and optical intensity at a given distance away from the emitter. The resulting wider beam is easier for the receiver 260 to detect and eliminates the need for complex and costly PAT components to keep the transmitter aligned with the receiver. As an example, the optic 216 can modify the light beam to a width of not less than 8-10 mm so that the beam qualifies for the Class 1 or 1M designations. A scope with reticle can be attached to the optical front end 216 to facilitate more precise aiming of the transmitter 210 towards the receiver 260. As illustrated in FIG. 2C and as will be described further below, the optic 216 of the transmitter 210 can be combined with the optic 222 of the receiver 220 to form a single optical system.

Referring again to example method 300 of FIG. 3, in step 315 the second receiver 260 of the second transceiver 250 receives the encoded light signal from the first transmitter 210. A second optical front end 262 can receive and focus the encoded light beam onto a second photosensor 264. In certain example embodiments, this is accomplished by positioning the second photosensor at the geometric center of the planar surface of a positive focal length, plano-convex or Fresnel type lens. The lens diameter and focal length, in combination with the adjustable distance between the photosensor and lens, is used to focus the incoming beam to produce the maximum optical intensity within the acceptance angle (aperture) of the photosensor. The second photosensor 264 can convert the encoded light beam to electrical signals that are processed by the second decoder 266. The second decoder 266 can comprise a demodulator, an amplifier, a signal processor, and a signal output interface. The second decoder 266 also can comprise an associated memory comprising instructions and configuration settings for modifying and processing received light signals. In step 320, the second decoder 266 can demodulate, amplify, and process the electrical signal so that it is in a usable form for an output device. For example, an output interface can provide the decoded signal to an output device such as the optional second GUI 280 or the optional second headset 290. In step 325, the second GUI 280 or second headset 290 provide the signal, such as sensor data, a text message, or a voice signal to a user.

In one example embodiment, the second receiver 260 can include a signal processor that provides a received signal strength indicator ("RSSI"). The RSSI can be a visual or audible indicator that indicates the strength of the signal received from the first transmitter 210. The signal processor can make comparisons to previously received signals in order to evaluate signal strength and can provide the RSSI to assist in adjusting the alignment of the second receiver 260. In other words, if the received signal is relatively weak, the user receives the RSSI and can adjust the second receiver so that it better aligns with the direction from which the encoded light signal is received. The user also can use the RSSI to adjust the second optical front end 262 to better focus the encoded light signal incident on the second receiver 260.

Steps 330 through 350 of example method 300 essentially replicate steps 305 through 325, but describe the transmission of an encoded optical signal from the second transmitter 270 to the first receiver 220. The second transmitter 270 comprises similar components as the first transmitter 210, including a second encoder 272, a second invisible light emitter 274, and a second optical front end 276. As with the first encoder 212, the second encoder 272 can comprise a signal input interface, a signal processor 292, and a modulator and amplifier 293. A memory associated with the second encoder 272 can comprise instructions and configuration settings for processing and modifying the outgoing signal from the second transmitter 270. Similarly, the optical front end 276 can include a beam spreading optic to produce a wider beam as well as an optional scope with reticle to facilitate more precise alignment of the second transmitter 270. As indicated in FIG. 2C, in certain embodiments, the optical front end 276 can be integrated with the optical front end 262 to form a single optical system for the second transceiver 250.

The first receiver 220 of the first transceiver 205 comprises components that mirror the second receiver 260, including an optic 222, a photosensor 224, and a decoder 226. As indicated in FIG. 2C, the optic 222 of the receiver 220 and the optic 215 of the transmitter 210 can be integrated into a single optical system. The decoder 226 can include a demodulator, an amplifier, a signal processor, and a signal output interface. The first receiver 220 can also include the optional RSSI functionality described previously with respect to the second receiver 260. Accordingly, it should be assumed that steps 330 through 350 are performed in a manner analogous to steps 305 through 325 and the details of each step will not be repeated.

The components of the first and second transceivers can be implemented as a discrete transmitter, a discrete receiver, and optionally a discrete GUI, as illustrated in FIG. 2, or they can be integrated into a single transceiver system as indicated in FIG. 2C. Similarly, the components of first and second encoders and decoders can be implemented as a discrete signal processor, discrete modulator/demodulator, and discrete amplifier or can be integrated into a single signal processing unit.

The following discussion is associated with the example embodiments illustrated in FIGS. 4 through 12. The example components of FIGS. 2A, 2B, and 2C and the example method of FIG. 3 can be applied to the example embodiments of FIGS. 4 through 12. Accordingly, the explanation of the components of FIGS. 2A, 2B, and 2C and the steps of the method of FIG. 3 will not be repeated for each example. In some cases, components and methods can be modified to suit one the applications illustrated in FIGS. 4 through 12.

Figure 4:
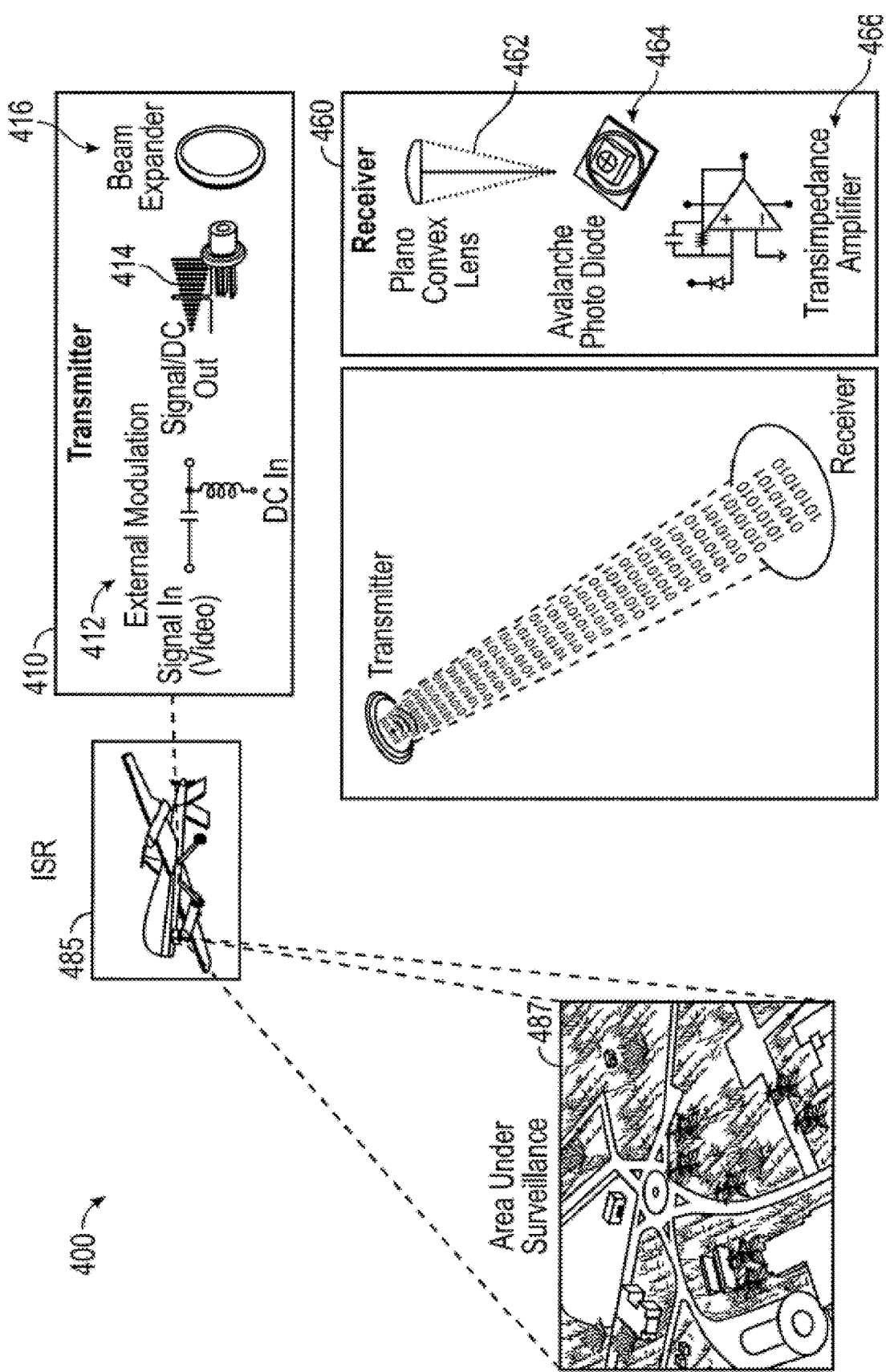
FIG. 4 illustrates an aerial surveillance implementation of an invisible light communication system in accordance with example embodiments of the disclosure.

Referring now to FIG. 4, an example implementation 400 of an ILC system for aerial surveillance is illustrated. As shown in FIG. 4, a ground area 487 can be surveilled by an aircraft 485. The aircraft 485 can gather images of the ground area 487 and can transmit the images, either still images or video, using a system such as the ILC systems described herein. Specifically, a transmitter 410 can be located onboard the aircraft 485 and can transmit the images using encoded invisible light signals to a receiver 460. The transmitter 410 is similar to the previously described transmitters in that it comprises an encoder 412, an invisible light emitter 414, and an optic 416. Likewise, the receiver 460 is similar to the previously described receivers in that it comprises a receiving optic 462 that focuses the encoded light beam onto a photosensor 464. The photosensor 464 converts the encoded light signal to electrical signals, that are demodulated, amplified, and processed by decoder 466. As an output, the decoder 466 can provide the reconstructed images or video that were captured by the aircraft 485. The invisible light communication signals in the example application of FIG. 4 can be transmitted in the range of 1540 nm to 1560 nm.

Figure 5:
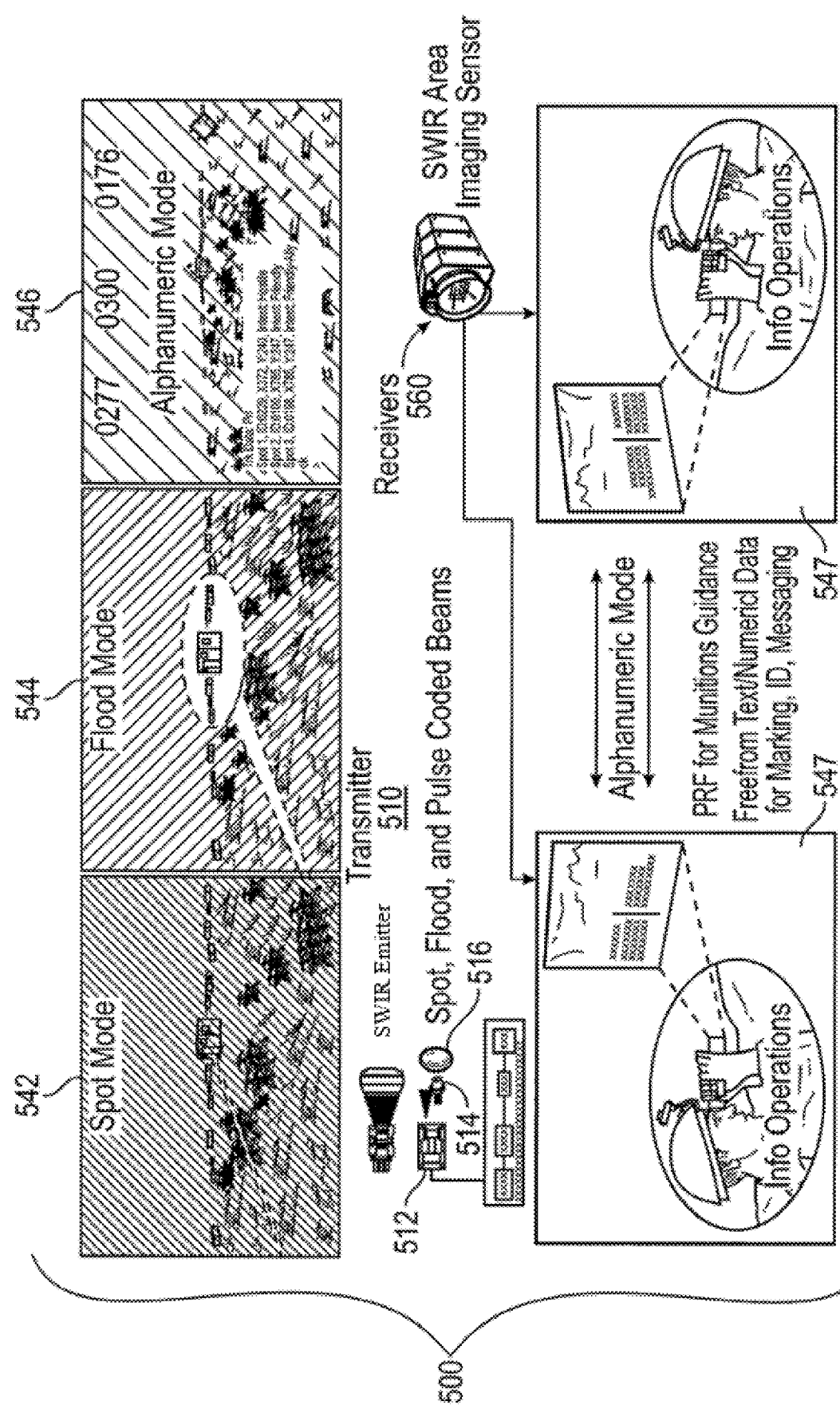
FIG. 5 illustrates different selectable modes of operation for an invisible light communication system in accordance with example embodiments of the disclosure.

Referring now to FIG. 5, an example implementation 500 of an ILC system for laser designation is illustrated. As shown in FIG. 5, the ILC system can be used to designate a target with an invisible light signal. In one case, in the spot mode 542, the transmitter 510 provides a high-power laser for extended range pointing and target marking. For example, a high powered LED in spot beam mode would be detectable at a distance of 43 kilometers with receiver 560. In another case, in the flood mode 544, the transmitter 510 provides a wide swath of invisible light to mark a targeted area over a 7 kilometer distance.

In yet another case, in the alphanumeric mode 546 and 547, operators of the ILC system can transmit codes for laser target designation. The ILC system can be set either in a standard pulse repetition frequency ("PRF") setting or a freeform setting. In the PRF setting, an operator can transmit STANAG 3733 compliant PRF codes for laser target designation by a spotter. The receiver 560 is able to detect and decode the PRF codes for marking targets in a scene displayed on a GUI. The freeform setting allows for creating virtual tags in a displayed scene similar to an augmented reality scene. The bottom portions 547 of FIG. 5 illustrates the virtual tag concept as it might appear on the displays of two receivers 560 of an ILC system. When an illuminated object or backdrop appears within the receiver's field of view, signal detection can be signified with a marker. The two displays in the bottom portion 547 of FIG. 5 show crosshairs used to mark the intended object or backdrop, as seen by two different operators, along with a decoded alphanumeric message. Potential uses of this implementation include a tactical message board that can be displayed to participants with receiver units of the ILC system.

An ILC system similar to those described previously is used to implement the laser designation examples of FIG. 5. Specifically, a transmitter 510 can be located onboard the aircraft, vehicle, or used in the field and can transmit the images using encoded invisible light signals, such as short wave infrared (SWIR) signals, that are detected by a receiver 560. The transmitter 510 is similar to the previously described transmitters in that it comprises an encoder 512, an invisible light emitter 514 (e.g., a laser diode), and an optic 516. A unique feature of this configuration is the ability change the modulation scheme of the transmitter such that the operator can use an input device, such a graphical user interface, to select between spot, flood, and alphanumeric mode. Data and instructions that enable the different configurations of each mode can be stored in memory associated with the encoder 512. Likewise, the receiver 560 is similar to the previously described receivers in that it comprises a receiving optic that focuses the encoded light beam onto a photosensor. A unique feature of this configuration is the ability to decode alphanumeric signals when the transmitter is set to alphanumeric mode. The photosensor converts the encoded light signal to electrical signals, that are demodulated, amplified, and processed by a decoder.

Figure 6:
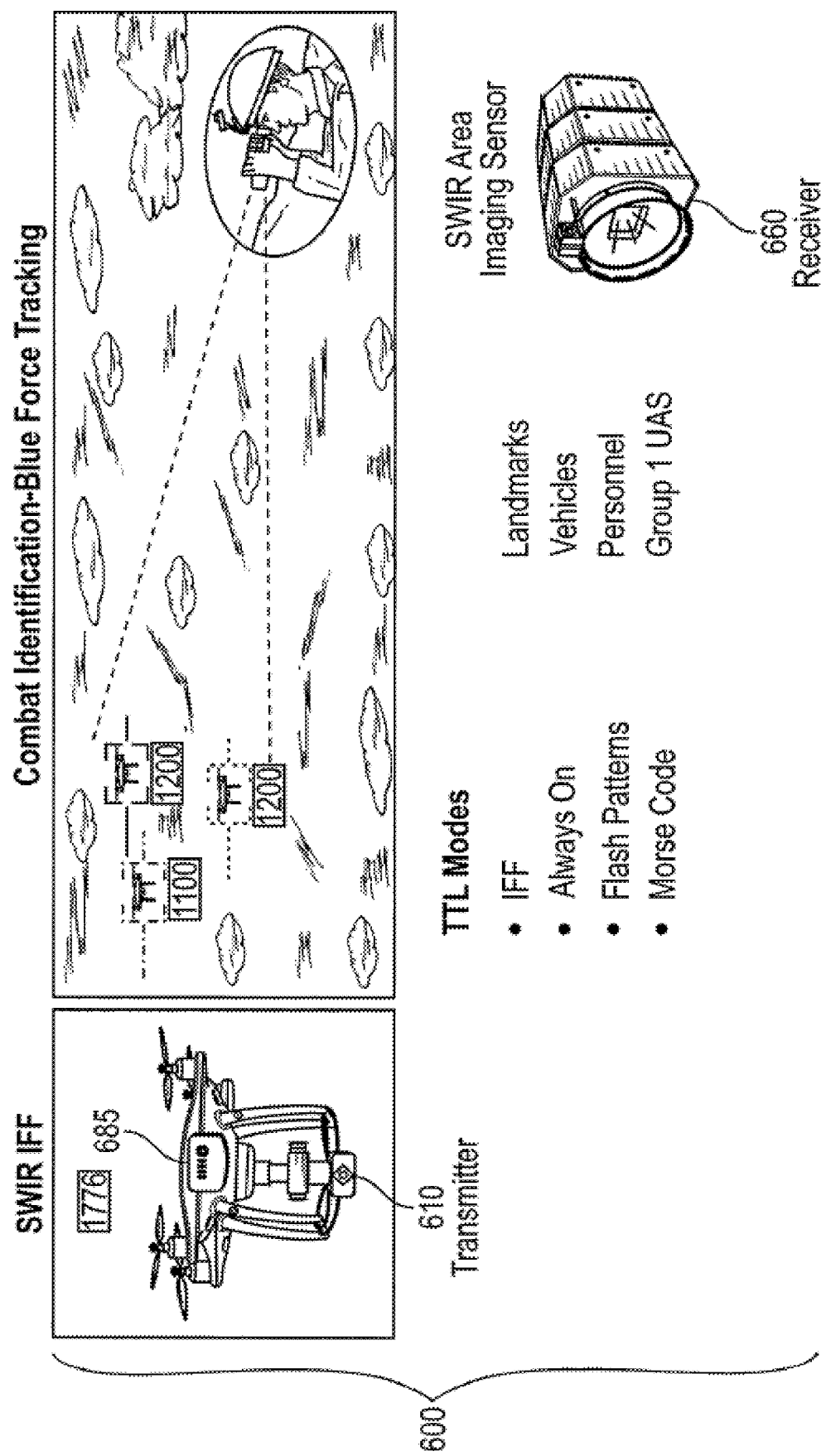
FIG. 6 illustrates an unmanned aerial system implementation of an invisible light communication system in accordance with example embodiments of the disclosure.

Referring now to FIG. 6, an example implementation 600 of an ILC system for tagging, tracking, and locating an unmanned aerial vehicle ("UAV") 685 is illustrated. Tracking UAVs and identifying UAVs as either friend or foe (known as IFF for Identification, Friend or Foe and Blue Force Tracking) can be a challenge in a military, law enforcement, or special use environment. As shown in FIG. 6, a beacon 610, similar to the previously described ILC transmitters, can be installed on a UAV 685. The beacon 610 is sufficiently small and lightweight that it will not interfere with the operation of the UAV 685. The beacon 610 can transmit encoded invisible light signals, such as short wave infrared signals, that identify the UAV 685 to a receiver 660. As with the previously described transmitters, the beacon 610 can comprise an encoder, an invisible light emitter, and an optic.

In some implementations, the beacon can be configured to transmit the encoded light signals in multiple directions away from the UAV, such as east, west, north, and south, so that the signal can be more easily received from various directions and the UAV can be identified by decoding the encoded light signal from the beacon using an ILC receiver as long as the transmitted signal is within the field of view of the receiver. Likewise, the receiver 660 is similar to the previously described receivers in that it comprises a receiving optic that focuses the encoded light beam onto a photosensor. The photosensor converts the encoded light signal to electrical signals, that are demodulated, amplified, and processed by a decoder so that the UAV can be identified. As indicated in FIG. 6, the beacon 610 can include various settings stored in memory enabling the beacon to be configured to transmit light signals in different modes, including always on, flash patterns, and morse code.

Figure 7:
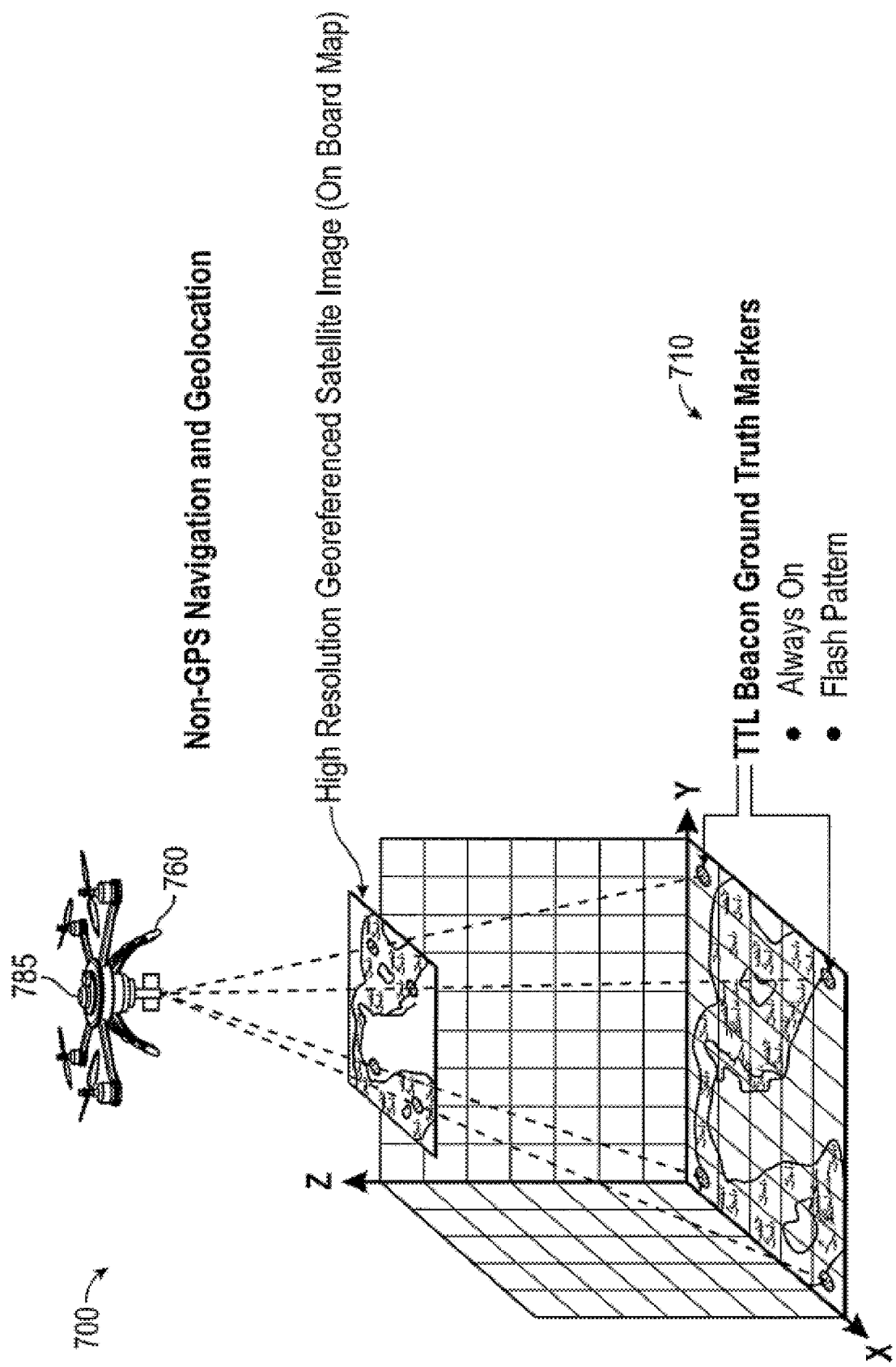
FIG. 7 illustrates a localization and mapping implementation of an invisible light communication system in accordance with example embodiments of the disclosure.

Referring now to FIG. 7, an example implementation 700 of an ILC system for localization and mapping is illustrated. In the example of FIG. 7, transmitters, similar to those described previously, in the form of beacons 710 can be placed in locations on the ground and used for navigation as an alternative to GPS navigation. The beacons 710 can be placed at various types of stationary landmarks, such as buildings, towers, and terrain summits and can serve as precise reference points for geolocation with an accuracy within 1 centimeter. A receiver 760, similar to those described previously, can be located onboard an aircraft 785 and can detect the encoded light signal emitted by the beacons 710. In one example, the encoded light signal can contain geographic coordinates for the location of the individual beacon. An image with the beacon locations can be compared to a satellite image onboard the aircraft 785 for purposes of navigation or target geolocation. This approach does not require accurate knowledge of the attitude or position of the aircraft 785 and, therefore, is particularly suited to UAV applications where conventional RF-based telemetry and GPS navigation systems may be unreliable.

Figure 8:
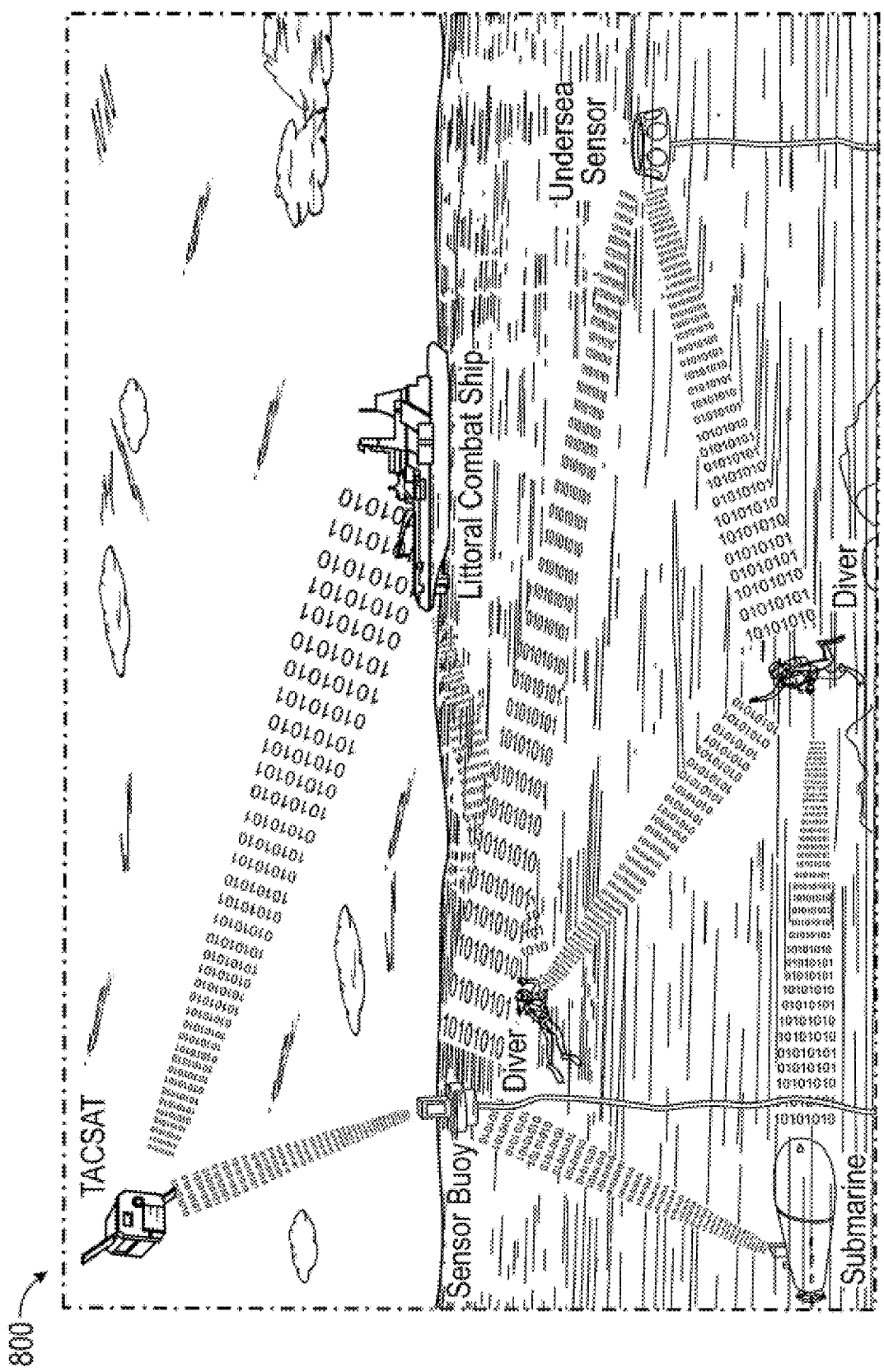
FIG. 8 illustrates an underwater implementation of an invisible light communication system in accordance with example embodiments of the disclosure.

Referring now to FIG. 8, an example implementation 800 of an ILC system used in an underwater environment is illustrated. In the example of FIG. 8, ILC system transmitters and receivers, similar to those described previously, can be located on an undersea sensor, onboard a submarine, or carried by a diver. The ILC system can use invisible light, such as light in the UV-B range of 280 nm to 315 nm, for communications underwater. Such underwater communications also can be exchanged with buoys and ships at the surface, which can relay communications to satellites or aircraft flying overhead. For example, undersea divers can use the ILC system to exchange voice and data communications. The undersea sensor and the sensor buoy can be used to detect and classify submarines and ships as they pass through the area.

FIGS. 9A-9D illustrate yet another application for an ILC system. Specifically, ILC system 900 includes an ILC transmitter similar to the previously described transmitters in that it includes an input device, an encoder, an emitter and an optic. In this case, the input device can be a memory containing a predetermined code that is transmitted by invisible light. The ILC system 900 also includes a receiver similar to the previously described receivers in that it includes an optic for receiving the light beam, a photosensor, and a decoder. The receiver of ILC system 900 is also coupled to a detonator that initiates a charge. The receiver can include a memory storing one or more codes that will trigger a detonator when the signal decoded by the decoder matches a code stored in the memory.

Figure 9A:
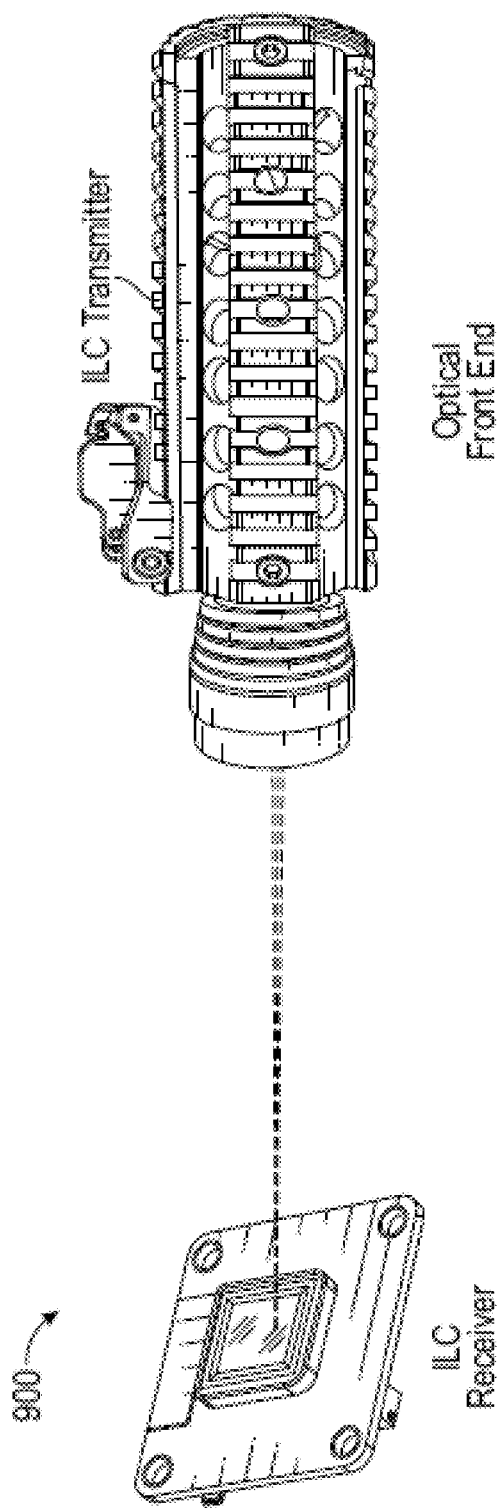
FIGS. 9A, 9B, 9C, and 9D illustrate applications of an invisible light communication system for remote detonation in accordance with example embodiments of the disclosure.
Figure 9B:
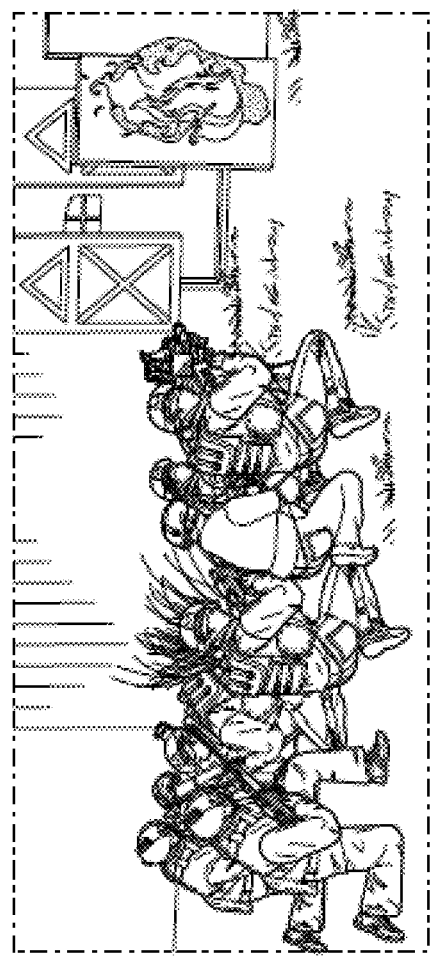
Figure 9C:
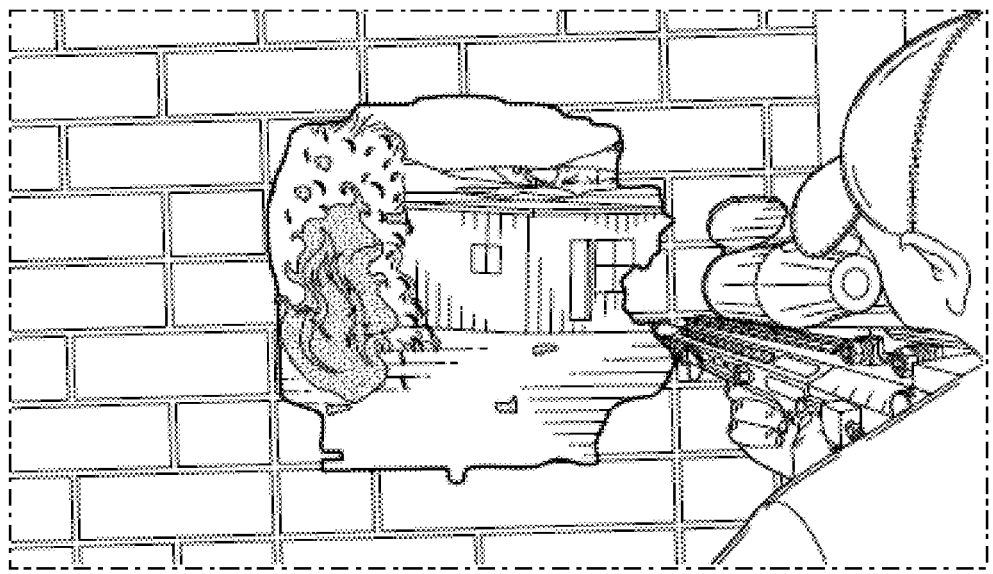
Figure 9D:
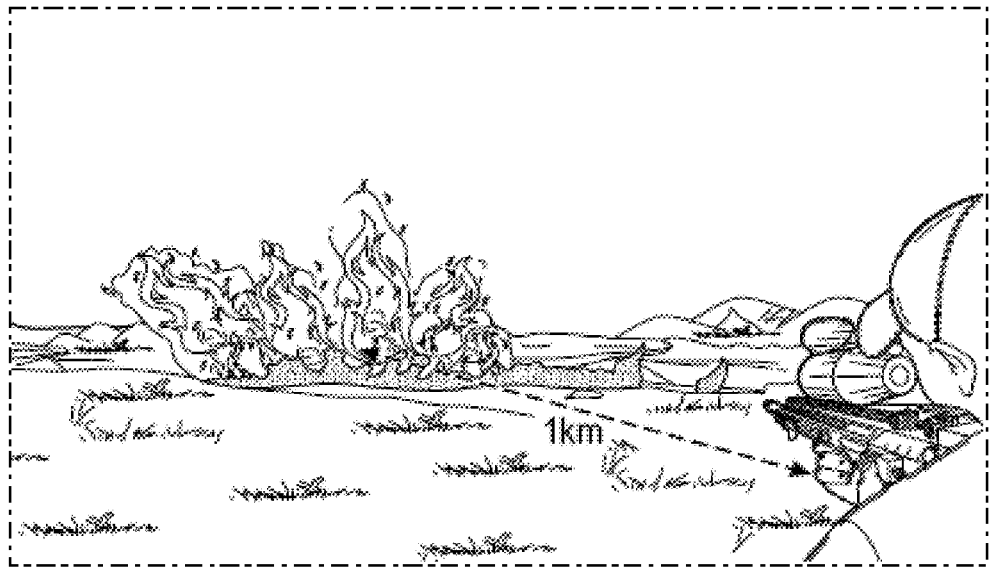

As illustrated in the examples of FIGS. 9B, 9C, and 9D, the receiver and detonator can be located a distance from the transmitter so that the ILC system can be used to detonate explosives from a remote location. The flexibility of the ILC system 900 allows the operator to detonate the explosive from various locations which allows for real-time adjustments of the operator's position as needed due to events in the field. For example, the operator can be as close as 3 meters from the explosive for a breach or as far away as 1000 meters for a demolition operation. Remote detonation using the ILC system 900 is beneficial because it eliminates the equipment traditionally required for detonation of a charge, such as shock tube assemblies, electric detonation cords, or plastic bonded explosive detonation cords. Elimination of this traditional detonation equipment can improve safety and save time and labor costs associated with running lengths of detonation wiring. Additionally, remote detonation using the ILC system 900 is not subject to radio frequency interference and provides a safer alternative for the operator of the ILC system.

The ILC system 900 also can be modified to control other remote devices aside from detonators, such as unmanned aerial systems. Programmable features of the transmitter allow a user to install code sets that can be transmitted to a receiver located on the remote device. The code set transmitted to receiver can be used to change settings at the remote device. As an example, tests conducted with and ILC system that includes medium powered (≤1340 mW) LEDs allows distances of over 500 m to be easily achieved. Distances of over 1 km will be possible using high powered (3200-7699 mW) LEDs or equivalent laser diode configurations as evidenced by a link distance of ~1697 m using a dual 1340 mW LED beam.

Figure 10B:
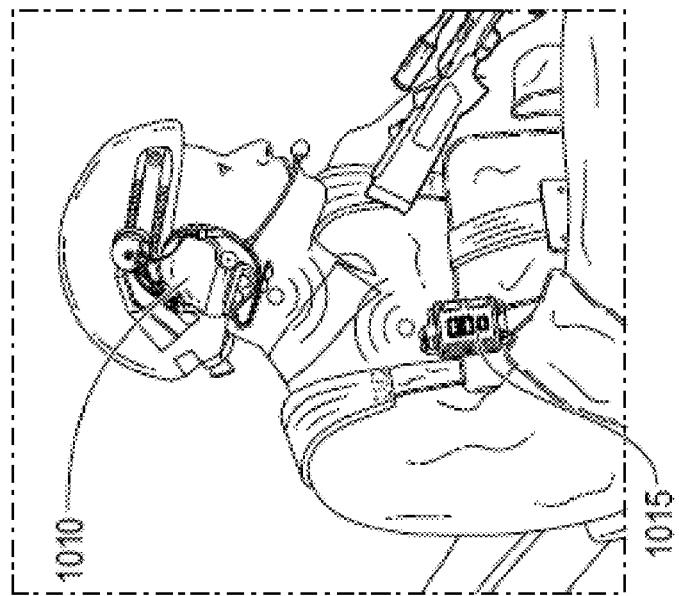
FIGS. 10A and 10B illustrate applications of an invisible light communication system as a wearable and tether-less, snag-free wireless communication system in accordance with example embodiments of the disclosure.
Figure 10A:
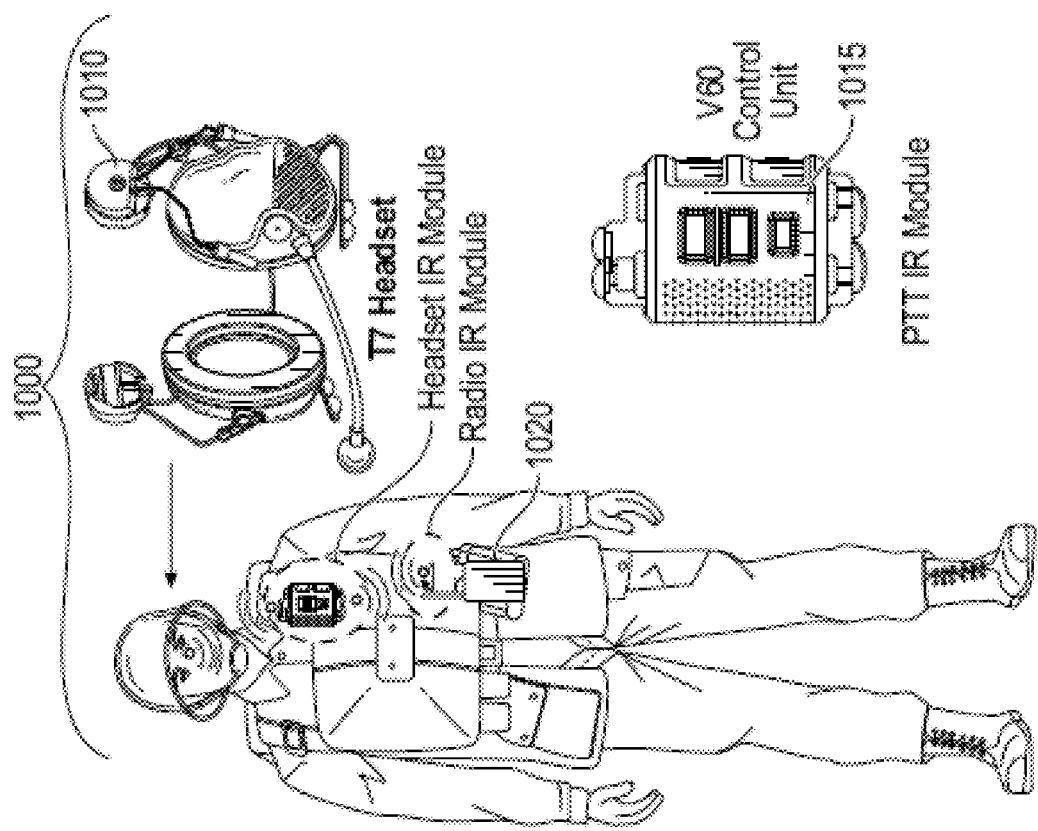

Referring now to FIGS. 10A, 10B, 11A, 11B, and 12, example applications of an ILC system associated with a wearable communication system are illustrated. Miniaturized implementations of the ILC transmitter and receiver components are sufficiently small to permit operators to employ them as wearable devices that are attached or integrated into their clothing, such as on a vest or helmet. FIGS. 10A and 10B illustrate a wearable communication system that implements the previously described transceivers and that is designed to reduce or eliminate the wires associated with conventional communication systems. Such wires can constrict the operator and present a hazard of becoming snagged on other objects. As one non-limiting example, the wearable communication systems sold by Invisio Inc. can be modified such that wired communication links are replaced with ILC transmitters and receivers described herein. The wearable communication system 1000 of FIGS. 10A and 10B comprises a headset 1010, a control unit 1015, and a radio 1020. Audio communications among the headset 1010, the control unit 1015, and the radio 1020 can be completed by encoding the audio data in the invisible light communication signals transmitted and received by ILC transceivers. The headset 1010 includes an ILC transceiver, similar to the previously described transceivers, that allows for non-radio frequency wireless communications with the control unit 1015. The control unit 1015 includes an upper transceiver for communications with the headset 1010 and a lower transceiver for communications with the radio 1020. A communication medium within the control unit 1015, such as a light pipe, can transfer invisible light communications between the upper transceiver and the lower transceiver of the control unit 1015. The radio 1020 includes a transceiver for communications with the lower transceiver of the control unit 1015. The transceiver in the radio 1020 can convert invisible light signals to radio signals that are transmitted by the radio antenna to other radio receivers. The wearable communication system 1000 provides a secure and reliable wireless communication system with a low probability that the communications would be detected or intercepted.

Figure 12:
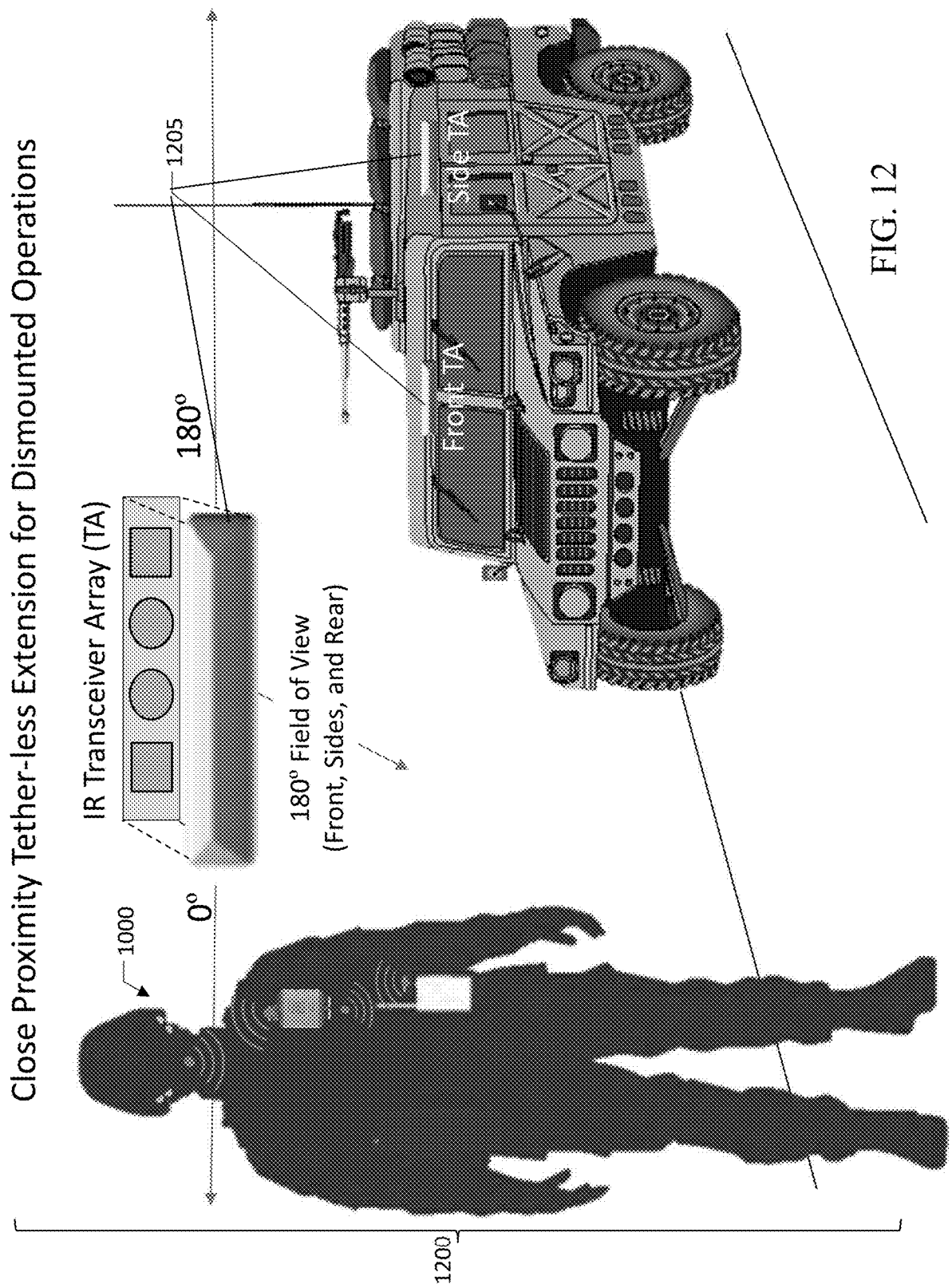
FIG. 12 illustrates an application of an invisible light communication system as a wearable wireless external intercom communication system in accordance with example embodiments of the disclosure.

The wearable communication system 1000 also is flexible in that it can be combined with other systems as illustrated in FIGS. 11A, 11B, and 12. FIG. 11A illustrates the wearable communication system 1000 combined with an intercom system 1100. The solution of FIG. 11A is designed to bridge the gap between dismounted and mounted operators. This will be accomplished by interconnecting the operators shown in the diagram to an intercom system, depicted as an IR puck 1105. The operators in the vehicle can each wear wearable communication systems 1000 as described previously in FIGS. 10A and 10B. The IR puck 1105 uses an infrared transceiver to permit internal voice communication and connectivity to tactical radios (combat nets) onboard the vehicle. The IR puck 1105 will be sufficiently low in size, weight, and power (SWaP) to operate from vehicle battery power or other power source and be easily relocated to another vehicle. FIG. 11B illustrates the 360 degree field of view of the puck comprising the front, right, left, and rear fields of view (FoV).

FIG. 12 illustrates the wearable communication system 1000 combined with an external transceiver system 1200. The transceiver array system 1200 includes ILC transceiver arrays 1205 mounted on the exterior of the vehicle. The transceiver arrays 1205 allow personnel to maintain communications with the vehicle using the wearable communication system 1000 while outside the vehicle. As one example, the transceiver arrays 1205 support communications with a person using the wearable communication system 1000 up to 10 meters away from the transceiver arrays 1205.

As the foregoing examples illustrate, the disclosed ILC systems provide a modular, scalable, open architecture (MOSA) that allows the transmitter and receiver units to be configured for a variety of applications. The disclosed ILC systems provide a software definable and hardware configurable platform that allow users to select one or more of the following desired modes of operation via hardware and/or software configurations: voice, video, remote sensing and control, tactical chat/messaging, and networking. This functionality, traditionally implemented in specific hardware configurations, is instead implemented by means of software on a computer or embedded system. Significant amounts of signal processing are handed over to a general-purpose processor, such as the previously described signal processors, rather than being done in special-purpose hardware (discrete electronic components or circuits). This design produces an ILC system which can receive and transmit widely different invisible light protocols or waveforms, and hence the functionality, based solely on the software used, enhances the MOSA requirements of military and industry.

The disclosed example ILC systems also solve the previously identified shortcomings or the prior art by providing a communication system that is secure and reliable, even in the presence of electromagnetic interference or intentional jamming. The described ILC systems are also beneficial in that there is a low probability the communications can be detected and intercepted. The adaptability of the emitter and the beam shaping optics of the optical front end provide versatility and extensibility for communications as well as target illumination and designation. Similarly, the configurability of the electronic components, including the encoder, the decoder, and the input and output devices, provides for simplified integration with a variety of systems, including C4ISR (Command, Control, Communications, Computers Intelligence, Surveillance, and Reconnaissance) systems.

In addition to the forgoing, the various embodiments of the present disclosure include, but are not limited to, the embodiments set forth in the following clauses.

Clause 1. An invisible light communication system comprising:
  a transmitter, the transmitter comprising:
    a transmitting signal processor and a modulator, wherein the transmitting signal processor processes an electrical signal from an input device and the modulator modulates the signal to produce a modulated electrical signal,
    an emitter that receives the modulated electrical signal and, in response, emits a beam of light in one of the infrared spectrum or the ultraviolet spectrum, and
    an emitter optic that is diverging, the emitter optic receiving the beam of light from the emitter and producing a broadened beam of light, and a receiver, the receiver comprising:
    a receiver optic that is converging, the receiver optic receiving the broadened beam of light from the transmitter and producing a converging beam of light,
    a photosensor that detects the converging beam of light and, in response, produces a received electrical signal, and
    a demodulator and a receiving signal processor, wherein the demodulator demodulates the received electrical signal and the receiving signal processor processes the signal for use by an output device.

Clause 2. The invisible light communication system of clause 1, wherein the transmitter further comprises a mode selector that changes the beam of light emitted by the emitter from a first wavelength to a second wavelength.

Clause 3. The invisible light communication system of clause 2, wherein the emitter comprises a first emitter that emits light of the first wavelength and a second emitter that emits light of the second wavelength.

Clause 4. The invisible light communication system of clause 1, wherein the input device is one of a microphone, a touchscreen interface, a motion sensor, a pressure sensor, and a light sensor.

Clause 5. The invisible light communication system of clause 1, wherein the output device is one of a display and a speaker.

Clause 6. The invisible light communication system of clause 1, wherein the transmitter is part of a first transceiver and the receiver is part of a second transceiver.

Clause 7. The invisible light communication system of clause 1, wherein the beam of light has a wavelength in one of the following ranges: 10 nm to 400 nm; 100 nm to 280 nm; 280 nm to 315 nm; 315 nm to 400 nm; 900 nm to 1700 nm; and 1540 nm to 1560 nm.

Clause 8. The invisible light communication system of clause 1, wherein the receiving signal processor detects a strength of the received electrical signal and provides a received signal strength indicator.

Clause 9. The invisible light communication system of clause 1, wherein the transmitter is located on an aircraft and transmits image data to the receiver.

Clause 10. The invisible light communication system of clause 1, wherein the emitter optic is adjustable among a spot mode, a flood mode, and an alphanumeric mode.

Clause 11. The invisible light communication system of clause 1, wherein the transmitter is located on an unmanned aerial vehicle and transmits information that identifies the unmanned aerial vehicle.

Clause 12. The invisible light communication system of clause 1, wherein the transmitter is located on a ground feature and transmits identifying information to the receiver, wherein the receiver is located on an aircraft.

Clause 13. The invisible light communication system of clause 1, wherein one or both of the transmitter and the receiver are located underwater.

Clause 14. The invisible light communication system of clause 1, wherein the transmitter transmits a detonation code and wherein the receiver triggers a detonator upon receiving the detonation code.

Clause 15. The invisible light communication system of clause 1, wherein the transmitter is located in a wearable headset and the receiver is located in one of a wearable control unit or a wearable radio.

Clause 16. The invisible light communication system of clause 15, further comprising a vehicle invisible light transceiver mounted on a vehicle, wherein the vehicle invisible light transceiver communicates with the transmitter and the receiver.

Clause 17. A communication method comprising:
emitting, by an emitter of a transmitter, an encoded invisible light signal, the encoded invisible light signal encoded by an encoder of the transmitter;
detecting, by a photosensor of a receiver, the encoded invisible light signal;
producing, by the photosensor of the receiver, an encoded electrical signal from the encoded invisible light signal;
decoding, by a decoder of the receiver, the encoded electrical signal to produce a decoded electrical signal; and
outputting the decoded electrical signal at an output interface of the receiver.

Clause 18. The communication method of clause 17, wherein the transmitter further comprises a mode selector that changes the encoded invisible light signal emitted by the emitter from a first wavelength to a second wavelength.

Clause 19. The communication method of clause 17, wherein the transmitter is located on an unmanned aerial vehicle and transmits information that identifies the unmanned aerial vehicle.

Clause 20. The communication method of clause 17, wherein the transmitter is located in a wearable headset and the receiver is located in one of a wearable control unit or a wearable radio.

Clause 21. The system or method of any of the preceding clauses, wherein the emitter is an LED having a power of at least 1120 mW/sr and the communication system has a range of at least 500 meters.

Clause 22. The system or method of any of the preceding clauses, wherein the emitter is a dual LED configuration having a combined power of at least 2200 mW/sr and the communication system has a range of at least 1600 meters.

Clause 23. The system of clause 8, wherein the receiver uses the received signal strength indicator to adjust the receiver optic to focus the converging beam of light.

Clause 24. The system of clause 10, wherein, in the alphanumeric mode, the broadened beam of light from the transmitter comprises a code that is a STANAG 3733 compliant pulse repetition frequency code, and wherein the receiver decodes the code and displays an alphanumeric message on the output device.

Clause 25. The system of clause 1, wherein the transmitter is located on an undersea sensor, wherein the broadened beam of light emitted from the transmitter has a wavelength in the range of 280 nm to 315 nm, and wherein the receiver is located on one of a buoy or a ship.

Clause 26. The system of clause 25, wherein the broadened beam of light comprises data associated with a detected submarine.

Clause 27. The system of clause 1, further comprising:
a transceiver located in a wearable headset, the transceiver comprising the transmitter;
a second transceiver located in a wearable control unit, the second transceiver comprising the receiver; and
a third transceiver located in a wearable radio,
wherein the first transceiver transmits audio encoded invisible light signals comprising audio data from the wearable headset to the second transceiver of the wearable control unit, and
wherein the second transceiver transmits the audio encoded invisible light signals comprising the audio data from the wearable control unit to the third transceiver of the wearable radio.

Clause 28. The system of clause 27, wherein the wearable radio converts the audio encoded invisible light signals comprising the audio data to radio signals for transmission to a radio receiver.

Clause 29. The system of clause 1, further comprising:
a transceiver located in a wearable headset, the transceiver comprising the transmitter;
a second transceiver located in an upper portion of a wearable control unit, the second transceiver comprising the receiver;
a third transceiver located in a lower portion of a wearable control unit; and
a fourth transceiver located in a wearable radio,
wherein the first transceiver transmits audio encoded invisible light signals comprising audio data from the wearable headset to the second transceiver of the wearable control unit,
wherein the third transceiver of the wearable control unit receives the audio encoded invisible light signals comprising audio data from the second transceiver of the wearable control unit, and
wherein the third transceiver transmits the audio encoded invisible light signals comprising the audio data from the wearable control unit to the fourth transceiver of the wearable radio.

Clause 30. The system of clause 29, wherein the second transceiver and the third transceiver communicate via a light pipe located within the wearable control unit.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:
1. A communication system comprising:
a headset worn by a user that includes a headset invisible light communication ("ILC") transceiver; and
a portable control unit that includes:
a first ILC transceiver in communication with the headset ILC transceiver; and
a second ILC transceiver in communication with a vehicle ILC transceiver;
wherein each of the headset ILC transceiver, the first ILC transceiver, the second ILC transceiver and the vehicle ILC transceiver comprises: a digital signal processor, an emitter, and a receiver.
2. The communication system of claim 1, wherein the vehicle ILC transceiver is located on an exterior of a vehicle.

3. The communication system of claim 2, wherein the vehicle ILC transceiver is one of at least two vehicle ILC transceivers that are mounted on different sides of the vehicle.

4. The communication system of claim 2, wherein the vehicle ILC transceiver provides communication with a radio onboard the vehicle.

5. The communication system of claim 2, wherein the vehicle ILC transceiver communicates with an intercom system located within the vehicle.

6. The communication system of claim 1, wherein the portable control unit is worn by the user.

7. The communication system of claim 6, wherein the portable control unit is attached to a helmet worn by the user.

8. The communication system of claim 6, wherein the portable control unit is attached to a vest worn by the user.

9. The communication system of claim 1, wherein one of the headset ILC transceiver, the first ILC transceiver, the second ILC transceiver, and the vehicle ILC transceiver comprises an optic with an adjustable position.

10. The communication system of claim 1, wherein one of the headset ILC transceiver, the first ILC transceiver, the second ILC transceiver, and the vehicle ILC transceiver comprises an optic that is adjustable between a spot mode and a flood mode.

11. The communication system of claim 1, wherein one of the headset ILC transceiver, the first ILC transceiver, the second ILC transceiver, and the vehicle ILC transceiver comprises an optic that is adjustable based upon a received signal strength indicator.

12. The communication system of claim 11, wherein the headset comprises a receiving signal processor that detects a strength of a received beam of light and provides a received signal strength indicator.

13. The communication system of claim 1, wherein the headset transceiver encodes audio data received at the headset as light communication signals and transmits the light communication signals to the first ILC transceiver of the portable control unit.

14. The communication system of claim 13, wherein the second ILC transceiver of the portable control unit transmits the light communication signals to the vehicle ILC transceiver.

15. The communication system of claim 1, wherein the second ILC transceiver of the portable control unit receives light communication signal from the vehicle ILC transceiver.

16. The communication system of claim 15, wherein the first ILC transceiver of the portable control unit transmits the light communication signals to the headset ILC transceiver.

17. The communication system of claim 1, wherein the headset comprises an input device that is one of a microphone, a touchscreen interface, a motion sensor, a pressure sensor, and a light sensor.

18. The communication system of claim 1, wherein the headset comprises an output device that is one of a display and a speaker.

19. The communication system of claim 1, wherein light communicated by the headset ILC transceiver, the first ILC transceiver, the second ILC transceiver, and the vehicle ILC transceiver has a wavelength in one of the following ranges:
    10 nm to 400 nm;
    100 nm to 280 nm;
    280 nm to 315 nm;
    315 nm to 400 nm;
    900 nm to 1700 nm; and
    1540 nm to 1560 nm.

20. The communication system of claim 1, wherein the portable control unit comprises a light pipe for transmitting light between the first ILC transceiver and the second ILC transceiver.

* * * * *